United States Patent [19]

Shibuya et al.

[11] Patent Number: 4,746,783

[45] Date of Patent: May 24, 1988

[54] WELDING CURRENT CONTROL CIRCUIT FOR SPOT WELDER

[75] Inventors: Yoshikazu Shibuya; Hideaki Toya, both of Hyogo, Japan

[73] Assignee: Mitsubishi Denki Kabushiki Kaisha, Tokyo, Japan

[21] Appl. No.: 58,222

[22] PCT Filed: Sep. 16, 1986

[86] PCT No.: PCT/JP86/00482

§ 371 Date: May 19, 1987

§ 102(e) Date: May 19, 1987

[30] Foreign Application Priority Data

Sep. 19, 1985 [JP] Japan .................................. 60-205213

[51] Int. Cl.⁴ ............................................. B23K 11/26
[52] U.S. Cl. ....................................... 219/113; 320/1
[58] Field of Search ............................. 219/113; 320/1

[56] References Cited

U.S. PATENT DOCUMENTS 2,184,628 12/1939 Watson et al. ...................... 219/113

OTHER PUBLICATIONS

Catalogue of Origin Electric Co., Ltd., issued May 1982.

Primary Examiner—Clifford C. Shaw
Attorney, Agent, or Firm—Sughrue, Mion, Zinn, Macpeak, and Seas

[57] ABSTRACT

In a spot welder in which the electric charge stored in an electrolytic capacitor (1a) is discharged through a welding circuit 3 to perform a welding operation, in order to prevent the lowering of the welding performance due to the inversion in polarity of the voltage of the electrolytic capacitor (1a), its main circuit includes another electrolytic capacitor (1b) which is connected in series to a DC source (5) and shunted by a resistor (7) and which is substantially equal in capacitance to the aforementioned electrolytic capacitor (1a), and after the electrolytic capacitor (1a) only is charged, a switch (2) is turned on so that the charge current of the electrolytic capacitor (1a) is discharged to charge the electrolytic capacitor (1b), whereby charging the electrolytic capacitors (1a) and (1b) in opposite directions is prevented.

2 Claims, 2 Drawing Sheets

WELDING CURRENT CONTROL CIRCUIT FOR SPOT WELDER

TECHNICAL FIELD

This invention relates to capacitor-operated spot welders, and more particularly to a spot welder in which the electrolytic capacitor is prevented from being reversely charged.

BACKGROUND ART

FIG. 3 is an electrical circuit diagram showing a conventional capacitor-operated spot welder indicated in a capacitor-operated spot welder catalog (May 1982) published by "Origin Denki Shoji Kabushiki Kaisha (Origin Electric Commercial Co. Ltd.)" in Japan. In FIG. 3, reference numeral 1 designates a charging and discharging electrolytic capacitor; 2, a back-to-back type thyristor switch for obtaining current from the capacitor 1; 3, a welding transformer for increasing the current; 4, materials to be spot-welded by the output of the welding transformer; 5, a DC source for charging the charging and discharging electrolytic capacitor 1; and 6, a charging resistor for suppressing the charging current.

The conventional spot welder is constructed as described above. Therefore, when, under the condition that the electrolytic capacitor 1 has been charged to a voltage V by the DC source 5, the thyristor switch 2 is turned on, the electrolytic capacitor 1 is discharged through the welding transformer 3 which is low in impedance, so that a current i having a large peak value flows. The parts (a) and (b) of FIG. 4 are explanatory diagrams showing the terminal voltage V of the electrolytic capacitor and the waveform of the discharge current, respectively. The components of the circuit have a loss. As a result, both the terminal voltage and the discharge current are of an oscillatory waveform which damps with time. The current, which is substantially proportional to the current i in the part (b) of FIG. 4 in accordance with the winding ratio of the welding transformer 3, is applied to the materials 4 through the welding transformer 3. As shown in the part (b) of FIG. 4, the oscillatory current i is interrupted at the current zero point $t_{off}$ after the thyristor switch is turned off. Thereafter, the electrolytic capacitor 1 is charged by the DC source 5 again; that is, the welding circuit is placed in the initial state. In the spot welder, the pulse-shaped oscillatory current is repeatedly caused to flow to spot-weld the materials.

However, the above-described conventional capacitor-operated spot welder suffers from difficulties that, since the terminal voltage of the electrolytic capacitor becomes negative as indicated by the shaded regions 10a and 10b in the part (a) of FIG. 4, the electrolytic capacitor 1 is deteriorated, so that the welding performance is gradually lowered.

DISCLOSURE OF THE INVENTION

Provided according to the invention is a spot welder in which a main circuit is made up of: a first electrolytic capacitor connected in parallel to a DC source; a second electrolytic capacitor which is connected in series to the DC source and is substantially equal in capacitance to the first electrolytic capacitor and which is shunted by a resistor; a switch connected in series to the second electrolytic capacitor; and a welding circuit connected in series to the switch to weld materials to be welded, and after the first electrolytic capacitor only is charged by the DC source, the switch is turned on to cause the charge current of the first electrolytic capacitor to flow in the welding circuit. In the welder of the invention, the main circuit includes not only the first electrolytic capacitor connected in series to the DC source but also the second electrolytic capacitor which is connected in series to the DC source and is substantially equal in capacitance to the first electrolytic capacitor and which is shunted by the resistor. Therefore, when, after the first electrolytic capacitor only is charged, the switch is turned on, the charge current of the first electrolytic capacitor charges the second electrolytic capacitor, and therefore charging the first and second electrolytic capacitors in opposite directions is prevented, i.e., the voltages of the capacitors are maintained unchanged in polarity.

Accordingly, deterioration of the capacitors is greatly suppressed, and the service lives thereof are lengthened. Therefore, the spot welder of the invention is high in reliability and could be small in the frequency of maintenance of the power source.

BEST MODE FOR CARRYING OUT THE INVENTION

Figure 1:
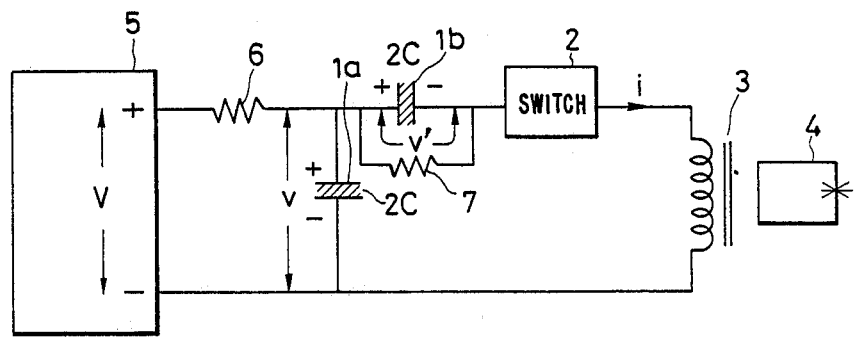
FIG. 1 is an electrical circuit diagram showing one embodiment of this invention.

FIG. 1 is an electrical circuit diagram showing one embodiment of this invention. In FIG. 1, reference character 1a designates a first charging and discharging electrolytic capacitor; 1b, a second charging and discharging electrolytic capacitor; 2, a back-to-back type thyristor switch; 3, a welding transformer; 4, materials to be welded; 5, a DC voltage; 6, a charging resistor; and 7, a resistor. In the embodiment, namely, a spot welder, its main circuit is made up of: the first electrolytic capacitor 1a parallel-connected through the charging resistor 6 to the DC source; the second electrolytic capacitor 1b which is connected in series to the DC source 5 and is substantially equal in capacitance to the first electrolytic capacitor 1a and which is shunted by the resistor 7; the thyristor switch 2 connected in series to the second electrolytic capacitor 1b; and the welding transformer 3 which is connected in series to the thyristor switch 2 and forms a part of a welding circuit for spot-welding the materials 4.

In the spot welder thus organized, after the first electrolytic capacitor 1a is charged to a voltage V by the DC source 5, the thyristor switch 2 is turned on. As a result, the first electrolytic capacitor 1a is discharged through the second electrolytic capacitor 1b and the welding transformer which is low in impedance, and a current i having a large peak value flows. The resistor 7 is to prevent the second electrolytic capacitor 1b from being charged when the first electrolytic capacitor 1a is charged by the DC source 5.

Figure 2A:
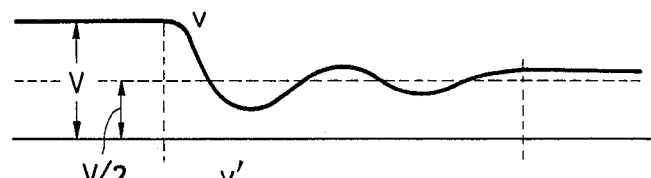
FIG. 2(a) is a diagram showing the waveform of the terminal voltage of a first electrolytic capacitor in FIG. 1.
Figure 2B:
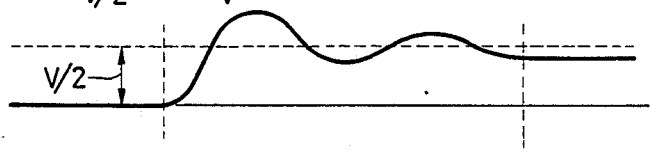
FIG. 2(b) is a diagram showing the waveform of the terminal voltage of a second electrolytic capacitor in FIG. 1.
Figure 2C:
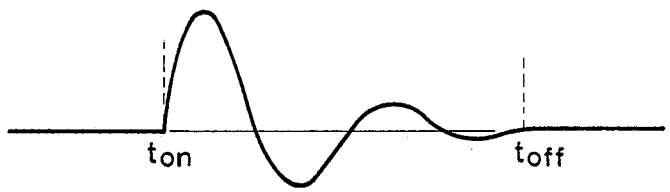
FIG. 2(c) is a diagram showing the waveform of a discharge current in the circuit of FIG. 1.

The parts (a), (b) and (c) of FIG. 2 show the waveforms of the terminal voltage V of the first electrolytic capacitor 1a, the terminal voltage V of the second electrolytic capacitor 1b, and the discharge current i, respectively.

Figure 3:
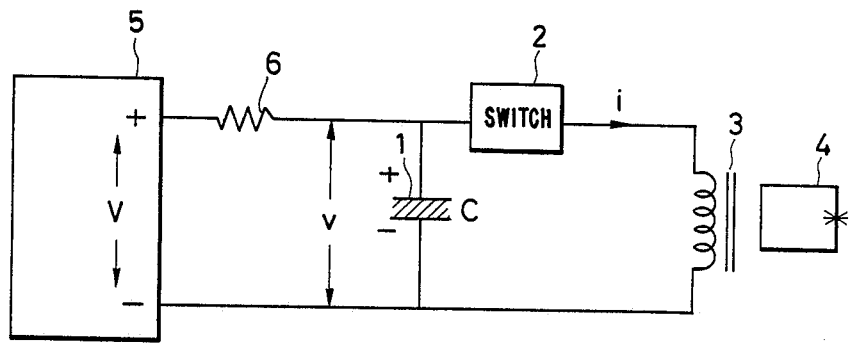
FIG. 3 is an electrical circuit diagram of a conventional spot welder.
Figure 4A:
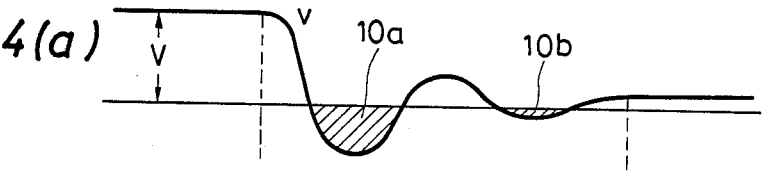
FIG. 4(a) is a diagram showing the waveform of the terminal voltage of an electrolytic capacitor in FIG. 3.
Figure 4B:
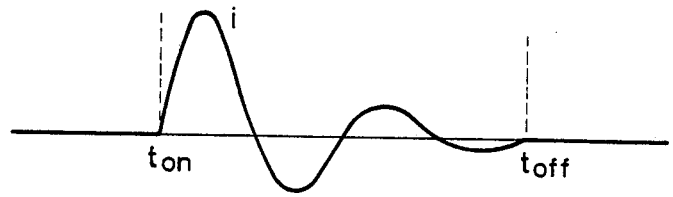
FIG. 4(b) is a diagram showing the waveform of a discharge current in the circuit of FIG. 3

If the capacitance of each of the first and second electrolytic capacitors 1a and 1b is represented by C, then the equivalent capacitance of these capacitors series-connected is C, being equal to that in the conventional spot welder shown in FIG. 3. Therefore, as shown in the part (c) of FIG. 2, the current waveform is completely equal to that in the part (b) of FIG. 4. The terminal voltage (V—V') of the first and second electrolytic capacitors 1a and 1b series-connected is of an oscillatory waveform whose amplitude changes positive and negative alternately. However, the voltages V and V', as shown in the parts (a) and (b) of FIG. 2, oscillate without changing the polarity. This is because, when the first electrolytic capacitor is discharged, the second electrolytic capacitor 1b is charged thereby, and therefore there is no load time for the first electrolytic capacitor 1a.

After the current i is interrupted at the time instant $t_{off}$, the first electrolytic capacitor 1a is charged to the voltage V by the DC source 5, while the second electrolytic capacitor 1b is discharged through the resistor 7; the terminal voltage of the second electrolytic capacitor 1b is decreased substantially to zero. The above-described operation is repeatedly carried out to achieve the spot welding. In the above-described embodiment, the thyristor switch 2 is employed as the switching means; however, an ignitron or discharge trigger gap may be used.

In the above-described embodiment, large current is supplied through the welding transformer 2 to the materials 4 to be welded. However, it goes without saying that if electrolytic capacitors sufficiently large in capacitance are employed, then the welding transformer may be eliminated, i.e., the output may be directly applied to the materials 4.

INDUSTRIAL APPLICATION

The technical concept of the invention is applicable not only to a spot welder in which the electric charge stored in an electrolytic capacitor is discharged for welding, but also to a pulse current generating source such as a power source for a laser.

We claim:
1. A welding current control circuit for a spot welder, comprising:
   first electrolytic capacitor means connected in parallel with a DC source;
   second electrolytic capacitor means which is connected in series with said DC source and is substantially equal in capacitance to said first electrolytic capacitor means and which is shunted by a resistor;
   switch means connected in series with said second electrolytic capacitor means; and
   welding circuit means connected in series with said switch for welding materials which are to be welded, and
   wherein the series/parallel arrangement of said first and second electrolytic capacitor means of substantially equal capacitances is such that, the transient voltages across said first and second electrolytic capacitor means is prevented from changing polarity during the time when the charge current of said first electrolytic capacitor means is caused to flow in said welding circuit means.
2. A spot welder as claimed in claim 1, characterized in that said switch is a thyristor switch means.

* * * * *